United States Patent
Boddakayala et al.

(10) Patent No.: US 10,056,642 B2
(45) Date of Patent: Aug. 21, 2018

(54) BATTERY ASSEMBLY INCLUDING BATTERY CELLS WRAPPED WITH THERMALLY CONDUCTIVE FILM

(71) Applicant: FORD GLOBAL TECHNOLOGIES, LLC, Dearborn, MI (US)

(72) Inventors: Bhaskara Boddakayala, Canton, MI (US); Saravanan Paramasivam, South Lyon, MI (US); Sai Perumalla, Rochester Hills, MI (US); Evan Mascianica, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 841 days.

(21) Appl. No.: 14/548,797

(22) Filed: Nov. 20, 2014

(65) Prior Publication Data
US 2016/0149274 A1 May 26, 2016

(51) Int. Cl.
| | | |
|---|---|---|
| *H01M 10/04* | (2006.01) | |
| *H01M 10/6554* | (2014.01) | |
| *H01M 2/10* | (2006.01) | |
| *H01M 2/02* | (2006.01) | |
| *H01M 10/625* | (2014.01) | |
| *H01M 10/653* | (2014.01) | |
| *H01M 10/6551* | (2014.01) | |
| *H01M 10/613* | (2014.01) | |

(52) U.S. Cl.
CPC .......... *H01M 10/04* (2013.01); *H01M 2/0262* (2013.01); *H01M 2/1077* (2013.01); *H01M 10/0413* (2013.01); *H01M 10/613* (2015.04); *H01M 10/625* (2015.04); *H01M 10/653* (2015.04); *H01M 10/6551* (2015.04); *H01M 2220/20* (2013.01)

(58) Field of Classification Search
CPC .............. H01M 10/04; H01M 10/613; H01M 10/6551; H01M 10/653; H01M 10/625; H01M 2/0262; H01M 10/0413; H01M 2/1077; H01M 2220/20
See application file for complete search history.

(56) References Cited

U.S. PATENT DOCUMENTS

| | | | |
|---|---|---|---|
| 6,106,973 A | 8/2000 | Sonozaki et al. | |
| 6,455,186 B1 * | 9/2002 | Moores, Jr. ............. | B25F 5/008 320/113 |
| 7,892,666 B2 | 2/2011 | Nakano et al. | |
| 8,551,635 B2 | 10/2013 | Ochi et al. | |
| 8,692,506 B2 | 4/2014 | Saito et al. | |

(Continued)

FOREIGN PATENT DOCUMENTS

| | | |
|---|---|---|
| DE | 102010012998 A1 | 9/2011 |
| WO | 2012057169 A1 | 5/2012 |
| WO | 2013176498 A1 | 11/2013 |

OTHER PUBLICATIONS https://web.archive.org/web/20140919132747/http://www.dupont.com/products-and-services/membranes-films/polyimide-films/brands/kapton-polyimide-film/products/kapton-mt.html, available online Sep. 19, 2014, accessed Aug. 6, 2017.*

*Primary Examiner* — Lisa S Park
(74) *Attorney, Agent, or Firm* — Carlson, Gaskey & Olds

(57) ABSTRACT

A battery assembly according to an exemplary aspect of the present disclosure includes, among other things, a plurality of battery cells and a thermally conductive film wrapped around each of the plurality of battery cells. Each thermally conductive film is contiguous with six sides of each of the plurality of battery cells.

17 Claims, 7 Drawing Sheets

(56) References Cited

U.S. PATENT DOCUMENTS

| | | | |
|---|---|---|---|
| 2010/0263201 A1* | 10/2010 | Hisamitsu | H01M 2/0212 |
| | | | 29/623.2 |
| 2011/0236750 A1 | 9/2011 | Kohno et al. | |
| 2012/0156569 A1 | 6/2012 | Kia et al. | |
| 2013/0130083 A1 | 5/2013 | Park et al. | |
| 2013/0344368 A1* | 12/2013 | Kwon | H01M 2/0277 |
| | | | 429/120 |
| 2014/0106210 A1* | 4/2014 | Deng | H01M 2/30 |
| | | | 429/179 |
| 2015/0140411 A1* | 5/2015 | Li | H01M 2/0292 |
| | | | 429/163 |

* cited by examiner

BATTERY ASSEMBLY INCLUDING BATTERY CELLS WRAPPED WITH THERMALLY CONDUCTIVE FILM

TECHNICAL FIELD

This disclosure relates to a battery assembly for an electrified vehicle. The battery assembly includes a plurality of battery cells and a thermally conductive film wrapped around each battery cell. The battery assembly excludes spacers positioned between adjacent battery cells of the assembly.

BACKGROUND

The need to reduce automotive fuel consumption and emissions is well known. Therefore, vehicles are being developed that reduce reliance or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

High voltage batteries for powering electric machines typically include multiple battery arrays. Each battery array includes a plurality of battery cells and a plurality of spacers that are arranged between adjacent battery cells. The battery cells and spacers are stacked side-by-side in an alternating fashion to physically separate the adjacent battery cells from one another. The spacers electrically isolate the battery cells from adjacent battery cells.

SUMMARY

A battery assembly according to an exemplary aspect of the present disclosure includes, among other things, a plurality of battery cells and a thermally conductive film wrapped around each of the plurality of battery cells. Each thermally conductive film is contiguous with six sides of each of the plurality of battery cells.

In a further non-limiting embodiment of the foregoing battery assembly, each of the plurality of battery cells includes an outer housing having a top surface, a bottom surface, opposing end walls and opposing side walls.

In a further non-limiting embodiment of either of the foregoing battery assemblies, the thermally conductive film covers the bottom surface, the opposing end walls and the opposing side walls but only partially covers the top surface.

In a further non-limiting embodiment of any of the foregoing battery assemblies, the thermal conductive film is made of polyethylene terephthalate (PET) or polyimide.

In a further non-limiting embodiment of any of the foregoing battery assemblies, the plurality of battery cells are sandwiched between end plates.

In a further non-limiting embodiment of any of the foregoing battery assemblies, spacers are positioned between the end plates and the plurality of battery cells.

In a further non-limiting embodiment of any of the foregoing battery assemblies, the battery assembly excludes spacers positioned between adjacent battery cells of the plurality of battery cells such that only the thermally conductive film extends between adjacent battery cells.

In a further non-limiting embodiment of any of the foregoing battery assemblies, the plurality of battery cells are positioned atop a heat exchanger.

In a further non-limiting embodiment of any of the foregoing battery assemblies, the heat exchanger includes an internal passage configured to communicate coolant.

In a further non-limiting embodiment of any of the foregoing battery assemblies, a plurality of fins extend inside the internal passage.

In a further non-limiting embodiment of any of the foregoing battery assemblies, the thermally conductive film only partially covers a top surface of each of the plurality of battery cells.

In a further non-limiting embodiment of any of the foregoing battery assemblies, each of the plurality of battery cells includes an exposed surface that extends between flap portions of the thermally conductive film, and comprising a ceramic coating disposed on the exposed surface.

In a further non-limiting embodiment of any of the foregoing battery assemblies, the exposed surface of a first battery cell of the plurality of battery cells is spaced at least 1.2 mm (0.047 inches) apart from the exposed surface of a second battery cell of the plurality of battery cells.

In a further non-limiting embodiment of any of the foregoing battery assemblies, the plurality of battery cells are positioned atop a heat exchanger, and a thermal interface material is disposed between at least a portion of the plurality of battery cells and the heat exchanger.

A method according to another exemplary aspect of the present disclosure includes, among other things, wrapping a battery cell with a thermally conductive film. The thermally conductive film covers a bottom surface, opposing end walls and opposing side walls of the battery cell but only partially covers a top surface of the battery cell.

In a further non-limiting embodiment of the foregoing method, the method includes conducting heat from the battery cell to an adjacent battery cell or conducting heat from the battery cell to a heat exchanger.

In a further non-limiting embodiment of either of the foregoing methods, the method includes conducting heat from the battery cell through the thermally conductive film and then to an adjacent battery cell and after conducting the heat to the adjacent battery cell, dissipating the heat into a heat exchanger.

In a further non-limiting embodiment of any of the foregoing methods, the method includes communicating coolant through the heat exchanger.

In a further non-limiting embodiment of any of the foregoing methods, the top surface of the battery cell includes an exposed surface uncovered by the thermally conductive film, and a ceramic coating is applied to the exposed surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly includes a plurality of battery cells and a thermally conductive film wrapped around each battery cell. The thermally conductive film is contiguous with six sides of the battery cell. In some embodiments, the thermally conductive film covers a bottom surface, opposing end walls and opposing side walls of the battery cell but only partially covers a top surface of the battery cell. The battery assembly excludes any spacers positioned between adjacent battery cells of the assembly. The thermally conductive film facilities thermal conduction and electrical isolation between adjacent battery cells. These and other features are discussed in greater detail in the following paragraphs of this disclosure.

Figure 1:
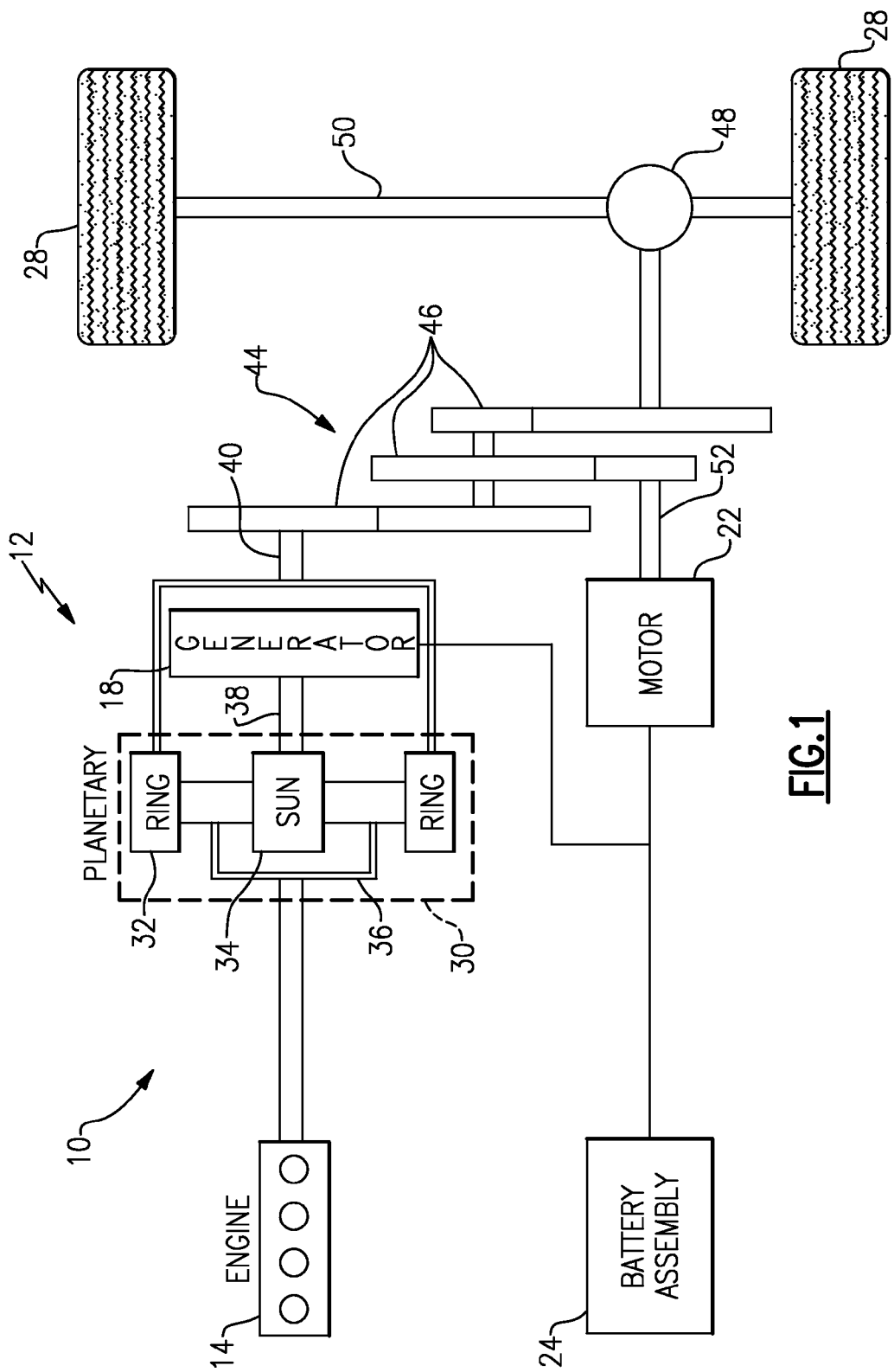
FIG. 1 schematically illustrates a powertrain of an electrified vehicle.

FIG. 1 schematically illustrates a powertrain 10 for an electrified vehicle 12. Although depicted as a hybrid electric vehicle (HEV) in this non-limiting embodiment, it should be understood that the concepts described herein are not limited to HEV's and could extend to other electrified vehicles, including, but not limited to, plug-in hybrid electric vehicles (PHEV's), battery electric vehicles (BEV's), and fuel cell vehicles (FCV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, such as an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may part of a high voltage battery pack that includes a plurality of battery arrays capable of outputting electrical power to operate the motor 22 and the generator 18. Other energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
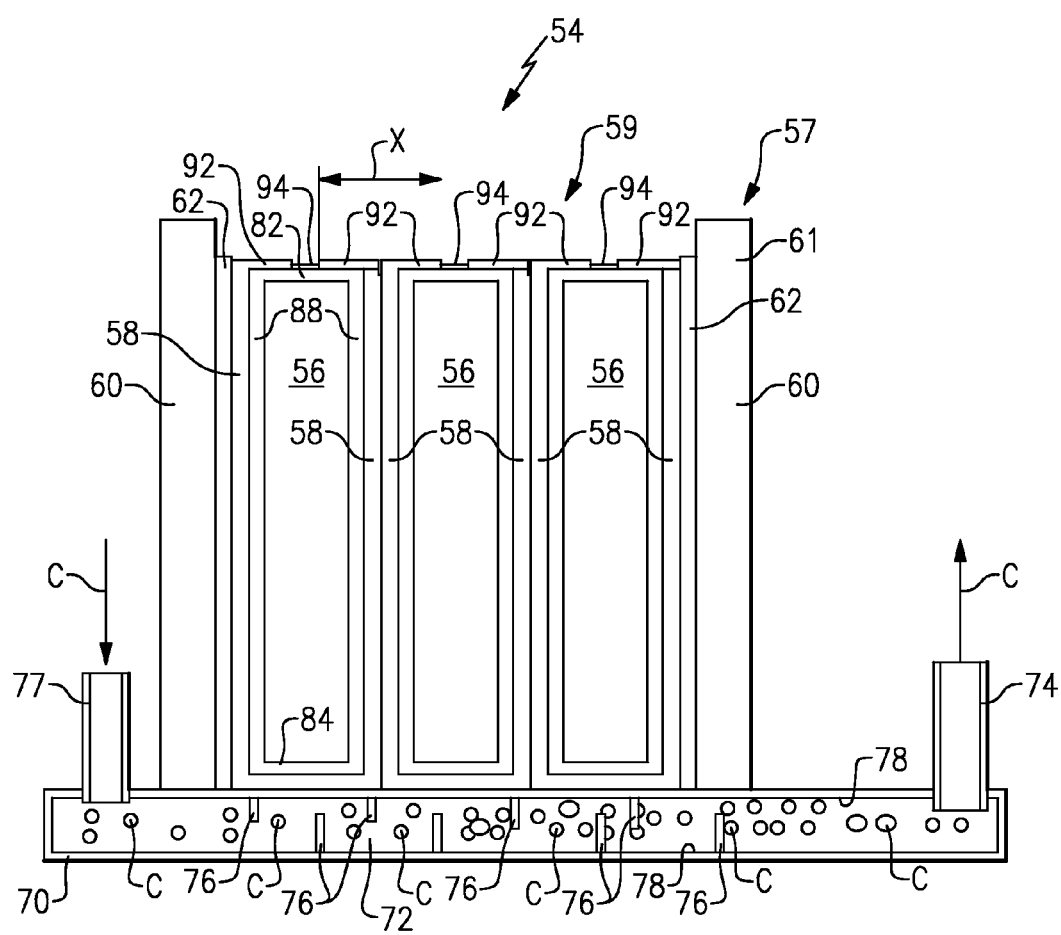
FIG. 2 illustrates a battery assembly of an electrified vehicle.

FIG. 2 illustrates a side view of a battery assembly 54. The battery assembly 54 may be employed within an electrified vehicle, such as the electrified vehicle 12 of FIG. 1. The battery assembly 54 includes a plurality of battery cells 56. The battery assembly 54 could include any amount of battery cells, and this disclosure is not limited to the specific configuration illustrated by FIG. 2. The battery cells 56 are stacked side-by-side to build a stack of the battery cells 56.

The battery cells 56 may be sandwiched between a support structure 57, which may include end plates 60 and spacers 62. In one embodiment, the spacers 62 are thermally insulated and are positioned at opposing ends of the stack of battery cells 56, and the opposing end plates 60 are positioned outboard of the spacers 62. The spacers 62 may include thermal resistant and electrically isolating plastics and/or foams that exhibit relatively high thermal insulating capabilities. The support structure 57 axially constrains the stacked battery cells 56. The battery cells 56 and support structure 57 together may be referred to as a battery array 59.

In one non-limiting embodiment, the battery cells 56 are prismatic, lithium-ion cells. However, other types of battery cells, including but not limited to nickel-metal hydride cells or lead acid cells, are also contemplated within the scope of this disclosure.

A thermally conductive film 58 may be wrapped around each battery cell 56 of the battery array 59. The thermally conductive film 58 facilitates thermal conduction between adjacent battery cells 56 and also electrically isolates adjacent battery cells 56 from one another. In one embodiment, the thermally conductive film 58 establishes a dielectric barrier between adjacent battery cells 56 of the battery array 59. In this way, the battery assembly 54 may completely exclude battery cell spacers located between the battery cells 56 such that only the thermally conductive film(s) 58 is disposed between adjacent battery cells 56. Battery cell spacers are also commonly referred to as separator or dividers.

The thermally conductive film 58 may be made of a thermally conductive material. In one embodiment, the thermally conductive film 58 is made of plastic. One non-limiting example of a suitable thermally conductive plastic material is polyethylene terephthalate (PET). In another non-limiting embodiment, the thermally conductive film 58 is made of polyimide. However, the thermally conductive film 58 could be made of other thermally conductive and electrically isolating materials within the scope of this disclosure. Non-limiting examples of other suitable materials include thermoplastic polyester film with high thermal conductivity (PETP) and silicone coated polyimide.

The battery assembly 54 may include other features for thermally managing the battery cells 56. In one embodiment, the battery assembly 54 includes a heat exchanger 70. The battery array 59 may be positioned atop of the heat exchanger 70. The heat exchanger 70 may include an internal passage 72 for communicating coolant C through the heat exchanger 70 in order to remove heat from (or add heat to) the battery cells 56. The coolant C is communicated through an inlet 77, through the internal passage 72, and then through an outlet 74 to remove heat from the battery cells 56 during some conditions, or alternatively, to add heat to the battery cells 56 during other conditions. The coolant C may be a conventional type of coolant mixture, such as water mixed with ethylene glycol. Other coolants are also contemplated and could alternatively be used.

In one non-limiting embodiment, the internal passage 72 of the heat exchanger 70 includes a plurality of fins 76. The fins 76 may protrude inwardly from an inner wall 78 that circumscribes the internal passage 72. The fins 76 slow the flow rate of the coolant C through the internal passage 72 to facilitate increased heat transfer between the battery cells 56 and the coolant C.

Figure 3:
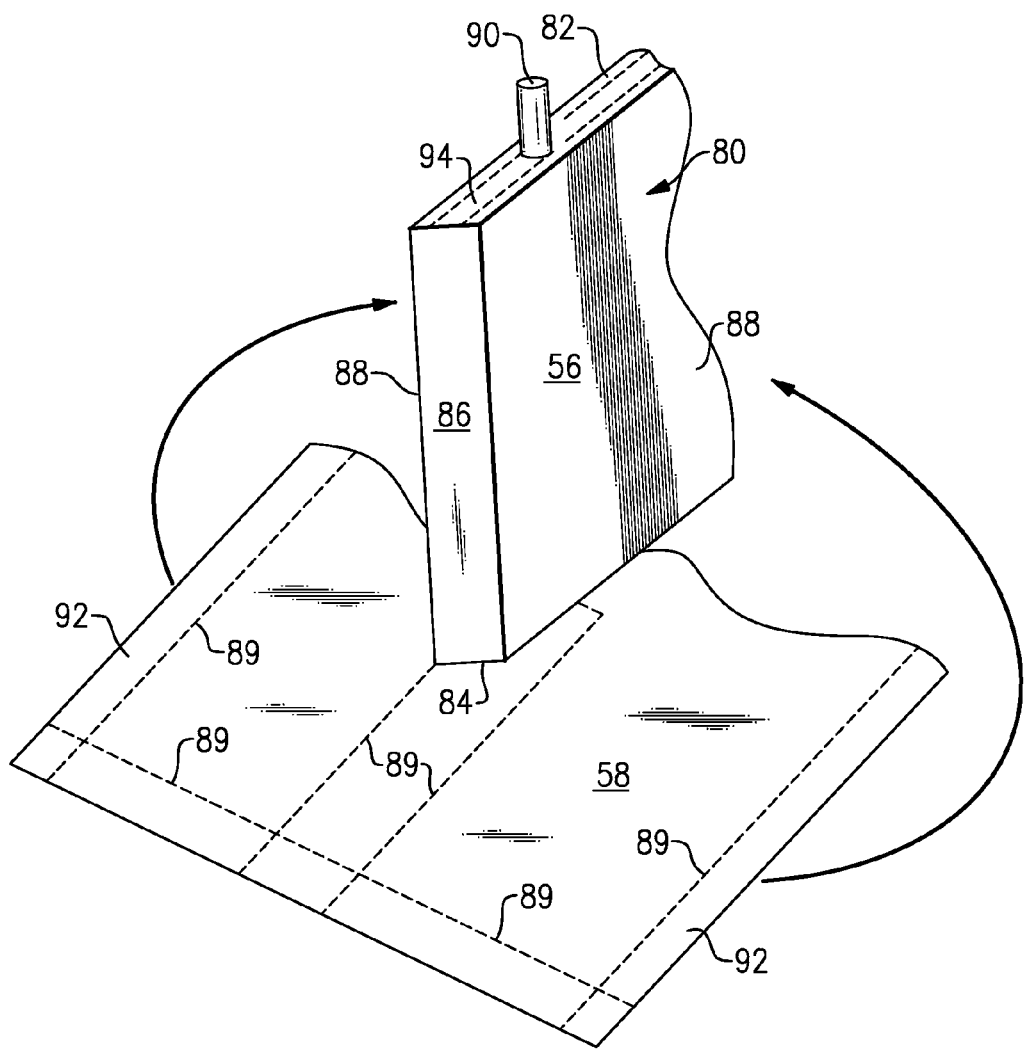
FIG. 3 schematically illustrates a battery cell wrapped with a thermally conductive film.

Referring now to FIGS. 2 and 3, each battery cell 56 includes an outer housing 80 having a top surface 82, a bottom surface 84, opposing end walls 86 and opposing side walls 88. The thermally conductive film 58 covers the bottom surface 84, the opposing end walls 86 and the opposing side walls 88. However, each thermally conductive film 58 only partially covers the top surface 82 of each battery cell 56. In this way, each thermally conductive film 58 is contiguous with six sides of each battery cell 56. The thermally conductive film 58 may bend at a plurality of creases 89 (see FIG. 3) in order to wrap the thermally conductive film 58 around the battery cell 56. The opposing side walls 88 of the battery cells 56 cannot contact one another by virtue of the thermally conductive films 58.

Figure 7:
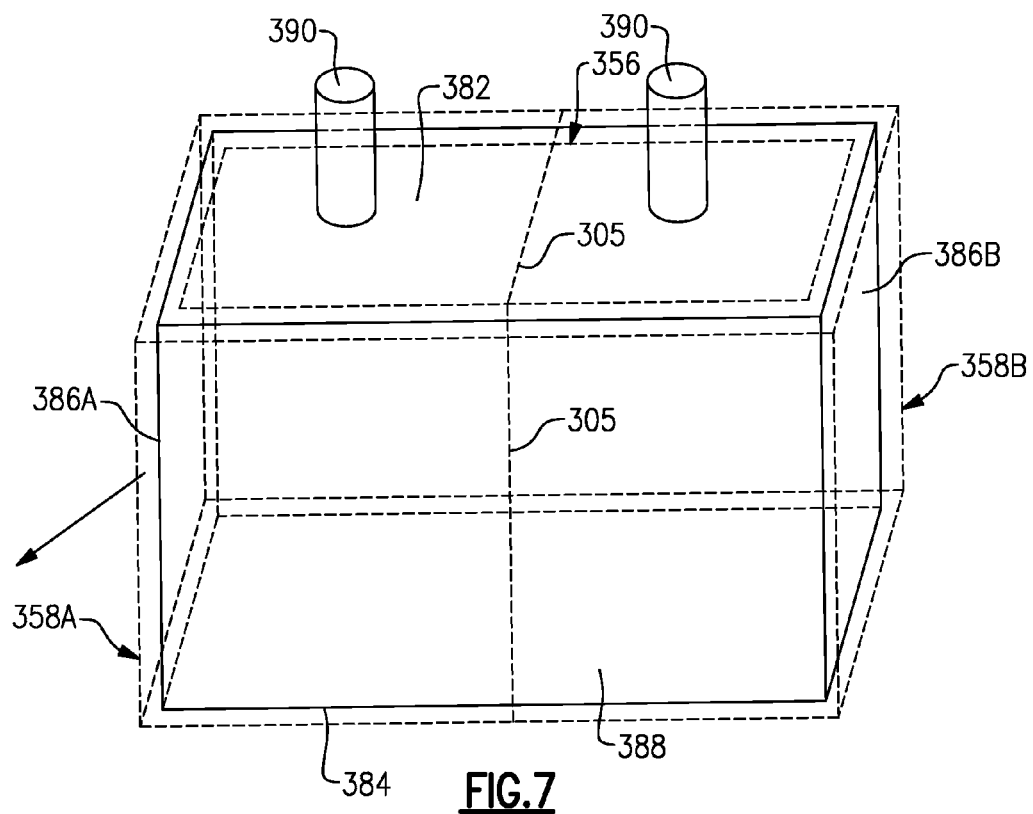
FIG. 7 schematically illustrates a battery cell wrapping procedure.

In one embodiment, the thermally conductive film 58 includes flap portions 92 that, when bent at the creases 89, extend toward one another from each of the opposing side walls 88 of the battery cell 56 to partially cover the top surface 82. Exposed surfaces 94 of the battery cells 56 extend between the flap portions 92. One or more terminals 90 (see FIG. 3), or electrical contacts, protrude upwardly from the top surface 82. The terminals 90 may extend from the exposed surfaces 94 outward of the thermally conductive film 58. Another battery cell wrapping procedure is illustrated in FIG. 7, which is discussed below.

The thermally conductive film 58 may separate the exposed surfaces 94 of adjacent battery cells 56 by a distance X (see FIG. 2). In one embodiment, the distance X is greater than or equal to 1.2 mm (0.047 inches) to limit electrical creep between adjacent battery cells 56.

Figure 4:
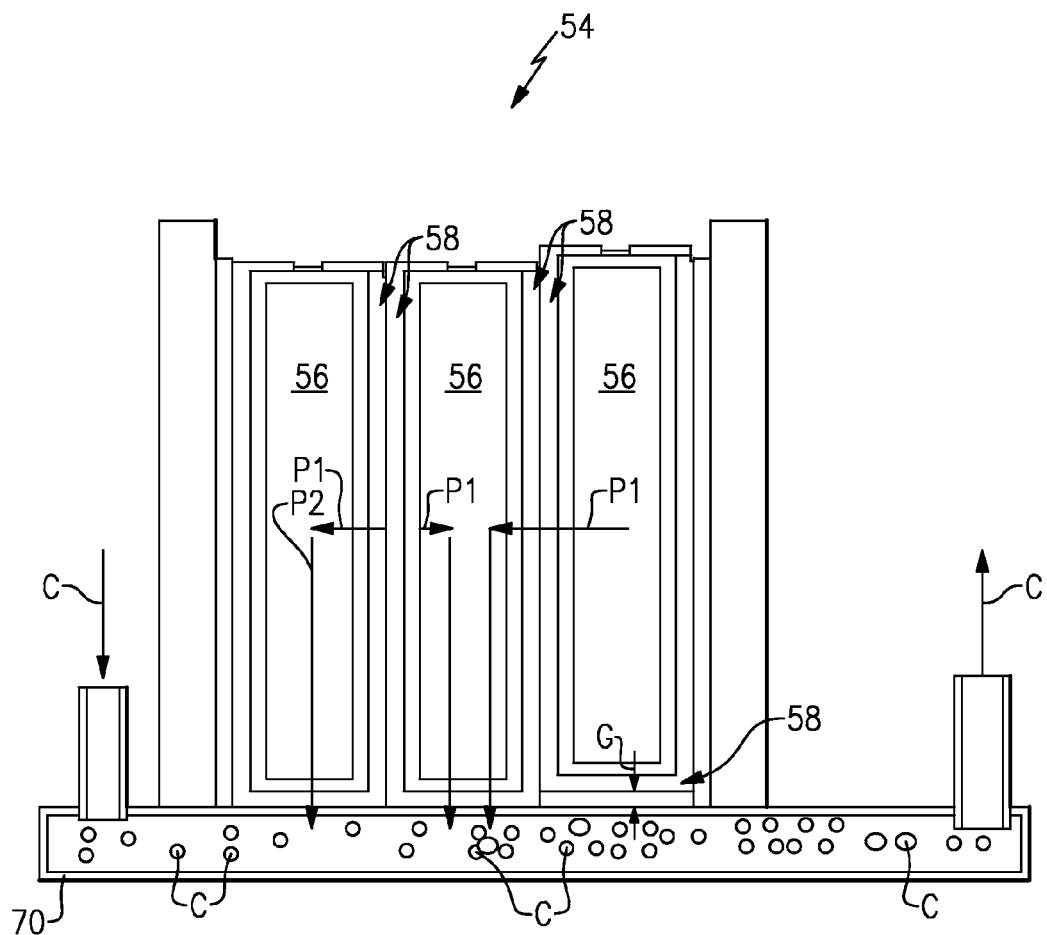
FIG. 4 schematically illustrates a cell lift condition of a battery assembly.

FIG. 4 illustrates the battery assembly 54 during a lift cell condition. A lift cell condition occurs when one or more of battery cells 56 become displaced from the heat exchanger 70. A gap G may extend between the thermally conducive film 58 and the heat exchanger 70 when such displacement occurs. Thermal management of the battery assembly 54 is facilitated by the thermally conductive films 58 even during lift cell conditions.

For example, the thermally conductive films 58, which exhibit a relatively miniscule level of thermal resistance, establish two paths of thermal conduction to thermally manage any heat generated by the battery cells 56, such as during battery charging or discharging operations. A first path P1 extends horizontally between adjacent battery cells 56 such that heat may be communicated from battery cell 56 to battery cell 56. A second path P2 extends vertically between each battery cell 56 and the heat exchanger 70 such that heat may be removed from the battery cells 56 and dissipated into the heat exchanger 70. Therefore, even during lift cell conditions, any heat generated by a battery cell 56 that has become displaced from the heat exchanger 70 may still be dissipated by being first communicated to an adjacent battery cell 56 along the first path P1. The heat may then be communicated along the second path P2 to the heat exchanger 70. The heat is then removed by virtue of heat transfer with the coolant C.

Figure 5:
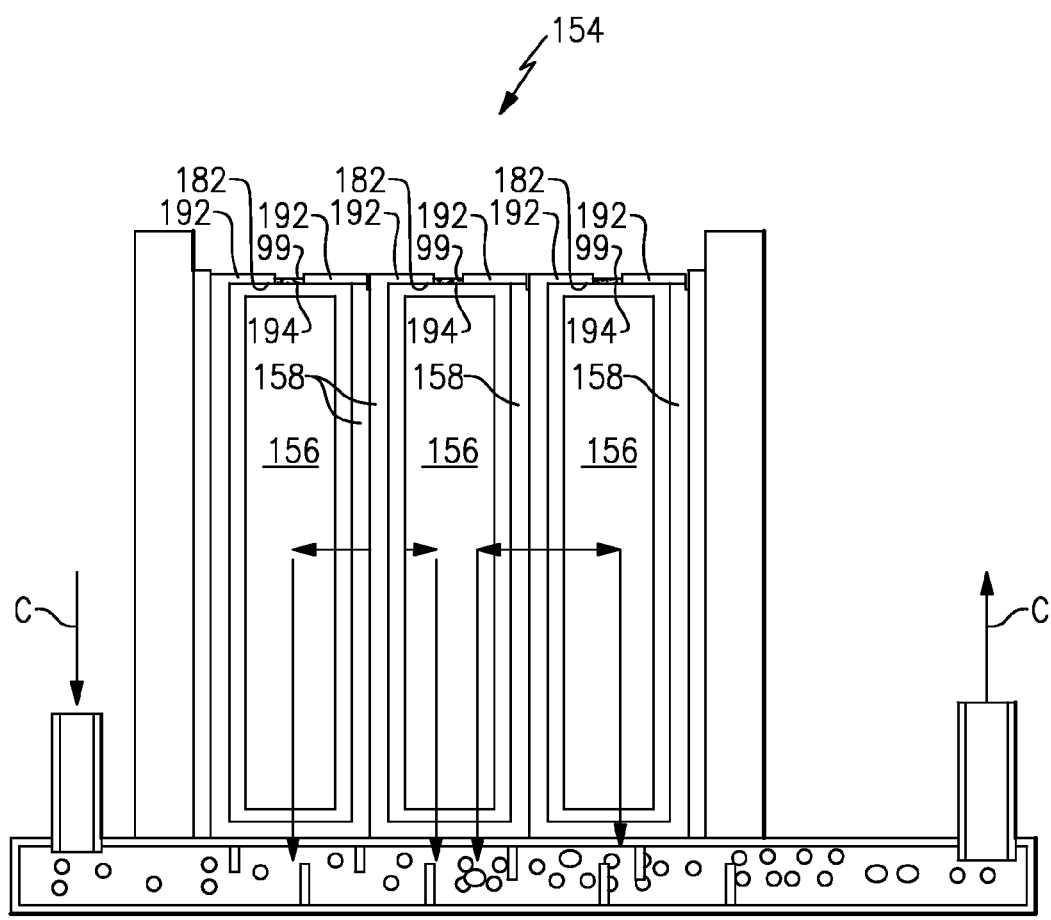
FIG. 5 illustrates a battery assembly according to another embodiment of this disclosure.

FIG. 5 illustrates a battery assembly 154 according to another embodiment of this disclosure. In this disclosure, like reference numbers designate like elements where appropriate and reference numerals with the addition of 100 or multiples thereof designate modified elements that are understood to incorporate the same features and benefits of the corresponding original elements.

The battery assembly 154 is nearly identical to the battery assembly 54 described above. However, in this embodiment, the battery assembly 154 includes an additional feature for electrically isolating adjacent battery cells 156. Each battery cell 156 includes a top surface 182. Portions of the top surfaces 182 of the battery cells 156 may be coated with a ceramic coating 99. In one embodiment, the ceramic coating 99 is applied to the exposed surfaces 194 of the battery cells 156 and could also be applied to portions of the battery cells 156 that extend under the thermally conductive films 158. The exposed surfaces 194 extend between flap portions 192 of the thermally conductive film 158 that is wrapped around each battery cell 156.

Figure 6:
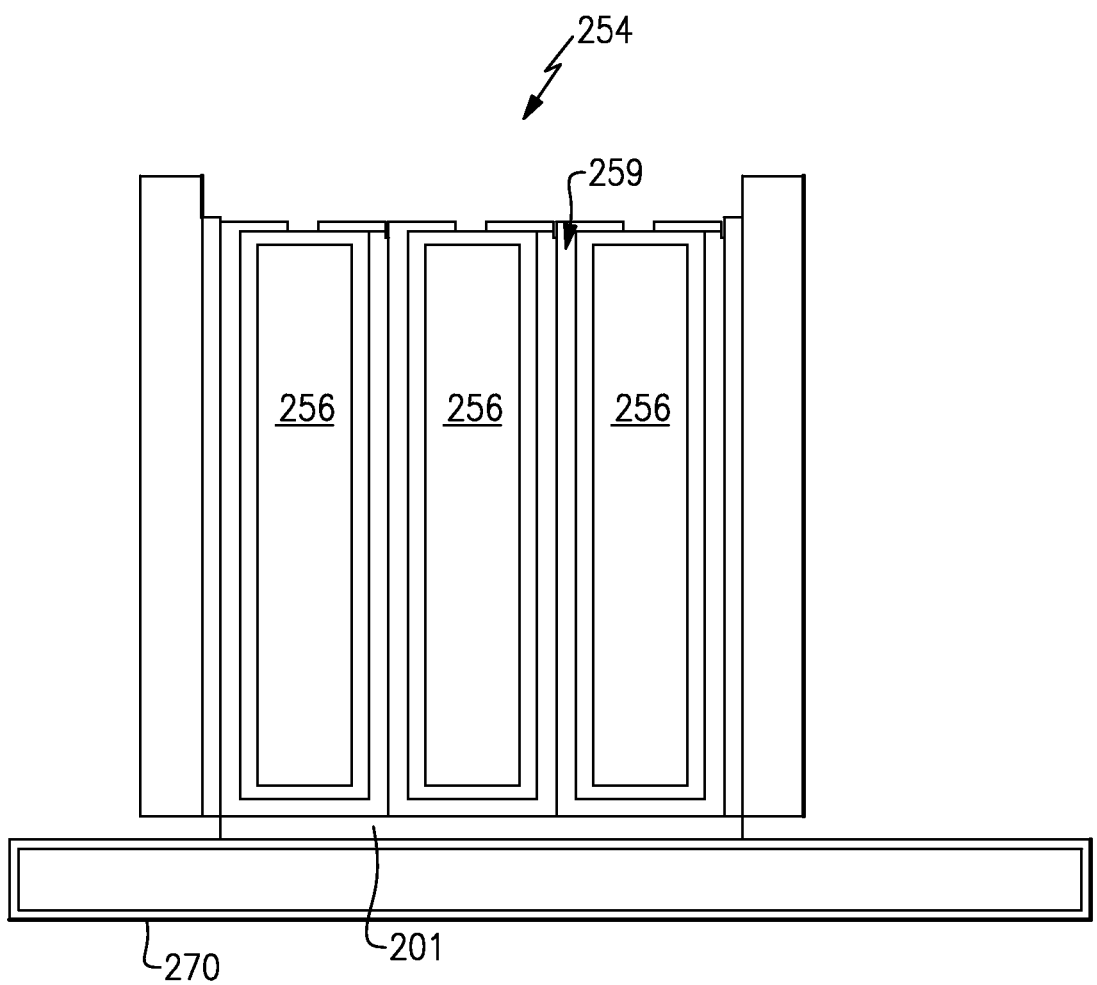
FIG. 6 illustrates a battery assembly according to yet another embodiment of this disclosure.

FIG. 6 illustrates yet another battery assembly 254. In this embodiment, the battery assembly 254 includes a battery array 259, a heat exchanger 270 and a thermal interface material 201 between the battery array 259 and the heat exchanger 270. The thermal interface material 201 may be made from a material having a relatively high thermal conductivity and is configured to maintain thermal contact between battery cells 256 of the battery array 259 and the heat exchanger 270 to increase the thermal conductivity between these neighboring components during a heat transfer event. The thermal interface material 201 can also fill micro-crevices on the heat exchanger 270 and accommodate any small variations between battery cells 256 along a bottom plane of the battery array 259.

FIG. 7 schematically illustrates another procedure for wrapping a battery cell 356 with thermally conductive films 358A, 358B. The battery cell 356 includes a top surface 382, a bottom surface 384, opposing end walls 386 and opposing side walls 388. One or more terminals 390 protrude upwardly from the top surface 82.

In one non-limiting embodiment of the cell wrapping procedure, a first thermally conductive film 358A may be wrapped around a first end wall 386A and a second thermally conductive film 358B may be wrapped around a second end wall 386B. Each thermally conductive film 358A, 358B may be generally U-shaped.

The first thermally conductive film 358A and the second thermally conductive film 358B meet at a seam 305 to surround the battery cell 356 and may be bonded together at the seam 305. For example, the thermally conductive films 358A, 358B may cover the bottom surface 384, the opposing end walls 386 and the opposing side walls 388, and at least partially cover the top surface 382. In this way, the thermally conductive film 358A, 358B is contiguous with six sides of each battery cell 356. The seam 305 may extend along a top, bottom and sides of the thermally conductive films 358A, 358B.

Figure 8:
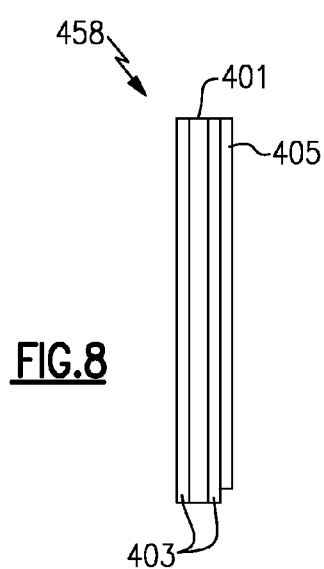
FIG. 8 illustrates an exemplary thermally conductive film.

FIG. 8 illustrates an exemplary configuration of a thermally conductive film 458. The thermally conductive film 458 may include a base 401 sandwiched between outer layers 403. The base 401 may be made of PET or polyimide, and the outer layers 403 may be made of either a silicone adhesive or an acrylic adhesive. A liner 405 may be attached to one of the outer layers 403. The liner 405 is removable and may be removed prior to wrapping the thermally conductive film 458 about a battery cell.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
a plurality of battery cells; and
a thermally conductive film wrapped around each of said plurality of battery cells, wherein each said thermally conductive film is contiguous with six sides of each of said plurality of battery cells;
wherein said thermally conductive film only partially covers a top surface of each of said plurality of battery cells,
wherein said thermally conductive film includes a first flap and a second flap that extend toward one another along said top surface but terminate short of one another to establish an exposed surface on said top surface.

2. The battery assembly as recited in claim 1, wherein each of said plurality of battery cells includes an outer housing having said top surface, a bottom surface, opposing end walls and opposing side walls.

3. The battery assembly as recited in claim 2, wherein said thermally conductive film covers said bottom surface, said opposing end walls and said opposing side walls but only partially covers said top surface.

4. The battery assembly as recited in claim 1, wherein said thermally conductive film includes polyethylene terephthalate (PET) or polyimide.

5. The battery assembly as recited in claim 1, wherein said plurality of battery cells are sandwiched between end plates.

6. The battery assembly as recited in claim 5, comprising spacers positioned between said end plates and said plurality of battery cells.

7. The battery assembly as recited in claim 1, wherein said battery assembly excludes spacers positioned between adjacent battery cells of said plurality of battery cells such that only said thermally conductive film extends between adjacent battery cells.

8. The battery assembly as recited in claim 1, wherein said plurality of battery cells are positioned atop a heat exchanger.

9. The battery assembly as recited in claim 8, wherein said heat exchanger includes an internal passage configured to communicate coolant.

10. The battery assembly as recited in claim 9, comprising a plurality of fins that extend inside said internal passage.

11. A battery assembly, comprising:
a plurality of battery cells; and
a thermally conductive film wrapped around each of said plurality of battery cells, wherein each said thermally conductive film is contiguous with six sides of each of said plurality of battery cells;
wherein said thermally conductive film only partially covers a top surface of each of said plurality of battery cells,
wherein each of said plurality of battery cells includes an exposed surface that extends between flap portions of said thermally conductive film, and comprising a ceramic coating disposed on at least said exposed surface.

12. The battery assembly as recited in claim 11, wherein said exposed surface of a first battery cell of said plurality of battery cells is spaced at least 1.2 mm (0.047 inches) apart from said exposed surface of a second battery cell of said plurality of battery cells.

13. The battery assembly as recited in claim 1, wherein said plurality of battery cells are positioned atop a heat exchanger, and a thermal interface material is disposed between at least a portion of said plurality of battery cells and said heat exchanger.

14. The battery assembly as recited in claim 1, wherein said thermally conductive film includes a polyethylene terephthalate (PET).

15. The battery assembly as recited in claim 1, wherein said thermally conductive film includes a thermoplastic polyester film.

16. The battery assembly as recited in claim 1, comprising a first crease between said first flap and a first portion of said thermally conductive film that covers a first side wall of one of said plurality of battery cells, and a second crease between said second flap and a second portion of said thermally conductive film that covers a second side wall of said one of said plurality of battery cells.

17. A battery assembly, comprising:
   a battery cell; and
   a thermally conductive film covering a bottom surface, opposing end walls, and opposing side walls of the battery cell but only partially covering a top surface of the battery cell;
   wherein the thermally conductive film includes a first flap and a second flap that extend toward one another along the top surface but terminate short of one another to establish an exposed surface on the top surface.

* * * * *